(12) United States Patent
Jean et al.

(10) Patent No.: US 7,973,677 B2
(45) Date of Patent: Jul. 5, 2011

(54) SYSTEM AND METHOD FOR DATA TRANSMISSION BETWEEN AT LEAST ONE DISPLAY SCREEN AND A CLIENT SYSTEM

(75) Inventors: David Jean, Castanet Tolosan (FR); Laetitia Lambinet, Toulouse (FR); Remi Cabaret, Toulouse (FR)

(73) Assignee: Airbus France, Toulouse (FR)

( * ) Notice: Subject to any disclaimer, the term of this patent is extended or adjusted under 35 U.S.C. 154(b) by 351 days.

(21) Appl. No.: 12/191,481

(22) Filed: Aug. 14, 2008

(65) Prior Publication Data

US 2009/0045981 A1 Feb. 19, 2009

(30) Foreign Application Priority Data

Aug. 14, 2007 (FR) ...................................... 07 57064

(51) Int. Cl.
*G08B 21/00* (2006.01)
(52) U.S. Cl. ........................................ 340/945; 370/310
(58) Field of Classification Search .................. 340/945; 370/310; 380/255; 455/517; 709/203, 218, 709/228; 713/182

See application file for complete search history.

(56) References Cited

U.S. PATENT DOCUMENTS

| | | | | |
|---|---|---|---|---|
| 5,661,517 A | * | 8/1997 | Budow et al. | 725/60 |
| 5,689,419 A | | 11/1997 | Massat | |
| 5,713,075 A | * | 1/1998 | Threadgill et al. | 455/427 |
| 5,805,807 A | * | 9/1998 | Hanson et al. | 370/340 |
| 5,848,246 A | * | 12/1998 | Gish | 709/228 |
| 6,160,551 A | | 12/2000 | Naughton et al. | |
| 6,175,922 B1 | * | 1/2001 | Wang | 713/182 |
| 6,373,950 B1 | * | 4/2002 | Rowney | 380/255 |
| 2007/0013693 A1 | | 1/2007 | Hedrick | |

OTHER PUBLICATIONS

French search report dated Apr. 3, 2008.

* cited by examiner

*Primary Examiner* — John A Tweel, Jr.
(74) *Attorney, Agent, or Firm* — Perman & Green, LLP

(57) ABSTRACT

A system and a method for data transmission between at least one display screen and a remote client system. A first request to send a message via a first communication protocol is caused to be displayed on the display screen, and the message is transmitted to the remote client system via a second communication protocol. A control unit monitors the remote client system. The system induces the generation, and display on the display screen, of a request for confirmation of the first request, by the intermediary of a communication interface, which interface is designed to receive and generate messages in the first communication protocol, as well as to receive and generate messages suitable for being received by the control unit.

10 Claims, 1 Drawing Sheet

SYSTEM AND METHOD FOR DATA TRANSMISSION BETWEEN AT LEAST ONE DISPLAY SCREEN AND A CLIENT SYSTEM

BACKGROUND

1. Field

The disclosed embodiments relate to a system and a method for data transmission between at least one display screen and a remote client system. The invention is particularly well suited to data transmission according to the "ARINC 661" protocol, between a control station (cockpit) of an aeronautical communication network and a client system.

2. Brief Description of Related Developments

The ARINC 661 protocol was developed by the aeronautical industry to define an industry standard for the graphic interface of video display screens in an aircraft cockpit (CDS) (cockpit display system), and to provide a suitable communication protocol between a client system and an aircraft control station (cockpit).

This protocol in particular permits sending of transactions, such as selection of a "button", from the control station to the client system.

According to the ARINC 661 protocol, the operating system at the control station should have a "kernel" which is capable of generating the hierarchical structure of the graphic interface, from a definition file (DF), during the initialization phase or a definition phase, of the CDS. This "kernel" also facilitates the sending of transactions.

The definition file is a binary file which contains the list of graphical objects (so-called "widgets") which will be required for the client system in order to generate its HMI pages (HMI=human-machine interface) before they are displayed at the control station. A given definition file is associated with a single client system (user application, UA), but the client system may be compatible with more than one definition file. The "widgets" are stored in a library managed by the CDS.

The "widgets" may be interactive, i.e. they may receive and may react to actions of the crew.

Such interactive commands are very practical and useful, because they allow an aircraft pilot to work (as a purely illustrative example) from a single support device, in particular his display screen, in order to execute and follow up with a task such as the fuel feed while in flight. This arrangement thus contributes to reduction of pilot workload and work stress.

However, such an arrangement is still plagued by temporary deficiencies, such as spontaneous updating of data by a client system without intervention by the aircraft pilot.

Consequently, it is necessary to improve the reliability of the interactive commands employed in the control station, in order to avoid spurious or untimely commands, or corruption of commands, in the system, which may have adverse effects on the aircraft and its passengers.

SUMMARY

In order to provide secure and reliable interchange of ARINC 661 data, the communication between the CDS system 1 and the client system 2 is supported on a point to point communication protocol such as the TFTP protocol (trivial file transfer protocol) (FIG. 1).

A key factor in providing such secure and reliable communication is thus the transmission of acknowledgment of receipt 3 of ARINC 661 data 4 by the client system 2.

In any event, the level of integrity against an erroneous or spurious or untimely command should not fall below the "MAJOR" threshold in the safety classification established by the aircraft manufacturer Airbus.

In this Airbus regulation, governing the correspondence between the likelihood of occurrence of an event and the resulting damage, which the event causes, four levels of criticality are defined—minor, major, hazardous, and catastrophic.

The "level of criticality" of a consequence will define the redundancy needed in the architecture to ensure the required level of reliability, in various equipment devices and components, and their associated functions.

At the "MAJOR" level of criticality, an event having major adverse effects on the aircraft and its passengers may not have an expectation of occurrence more frequently than once per 100,000 flight hours ([abbreviated as] likelihood of occurrence=1/100,000).

Certain critical client systems of an aircraft, such as the "FUEL" system, which supplies fuel while the aircraft is in flight, are designed to use interactive commands, which require very high reliability ("HAZARDOUS" level of criticality).

This level of reliability may be achieved, e.g., by ensuring that any command to modify a parameter results in a request for "confirmation" being displayed on the display screen.

This system thus requires two actions on the part of the aircraft pilot, namely the modification of the data and the confirmation of this modification. The display screen will send two successive transactions in ARINC 661 protocol to the client system, to ensure that the latter will take into account the order entered by the control person (pilot).

At this (HAZARDOUS) level of criticality, an event having critical adverse effects on the aircraft and its passengers may not permissibly have an expectation of occurrence more frequently than once per 10,000,000 flight hours ([abbreviated as] likelihood of occurrence=1/10,000,000).

For safety reasons, a client system on board an aircraft is monitored and controlled by a control unit of the computer type, which serves to monitor and control ARINC 661 data exchanges between said client system and the display screen.

However, the use of point to point communication between the display and the client system does not allow receipt of ARINC 661 by the aforementioned control unit.

Consequently, the required level of reliability is not achieved, which poses a certain danger to the aircraft and passengers.

Accordingly, an underlying problem addressed by aspects of the disclosed embodiments was to devise a method and system for data transmission between at least one display screen and a remote client system, which method and system are simple in conception and in mode of operation, and which allow taking into account by the control unit of messages issued as a result of requests posted on the display screen, such as to achieve a higher level of reliability than according to known methods and systems.

In this connection, the disclosed embodiments concern a system of data transmission between at least one display screen and a remote client system, which client system is connected to said screen by a link, and is controlled by a control unit, wherewith said screen is designed to present at least one interactive means of indication which indicates a request to send one or more messages in a first communication protocol.

In one aspect of the disclosed embodiments in that the system comprises a communication interface designed to receive and generate messages in said first communication protocol, as well as to receive and generate messages suitable for being received by said control unit.

The aforesaid interactive means of indication may comprise a "window" displayed on the display screen, which window contains a proposal to modify a value, by the intermediary of a "combined zone" (which is a dialog box element which combines a text zone and an "open list"), or a field allowing the entry of a value.

According to various embodiments of the described system for data transmission, each of which has particular advantages (and with allowance for numerous combinations of technical features):

The link between the display screen and the remote client system is a point to point link, and the aforementioned communication interface is disposed in the display screen; and The communication interface is designed to receive and send raw data messages from/to said remote client system and/or the aforesaid control unit;

NB: The term "raw data" is understood to refer to non-"ARINC 661" data, such as boolean data, numerical data, or character strings. These data are transmitted without a TFTP protocol.

The display screen is connected by a point to multipoint link to said remote client system and said control unit, and said communication interface has a destination address and is designed to receive said messages in said first communication protocol;

The first communication protocol is the ARINC 661 protocol;

The system comprises a selection device and control organ ("command device"), which serves to select among a set of data presented on the display screen in the form of a particular request;

As a purely illustrative example, the selection device and control organ may be chosen from the group comprising a control trackball, a joystick, and a touch pad.

The system comprises a keyboard, which allows personnel to enter particular data into a field in a "window" displayed on the display screen.

The disclosed embodiments also relate to a method of data transmission between a display screen and a remote client system, wherein a first request to send a message in a first communication protocol is caused to appear on said display screen, wherewith said message is transmitted to said remote client system in a second communication protocol, and said remote client system is controlled by a control unit.

According to the disclosed embodiments, the generation and display on said display screen of a request for confirmation of the first request are induced by the intermediary of a communication interface which is designed to receive and generate messages in said first communication protocol, and to receive and generate messages suitable for receipt by said control unit.

Preferably, the request for confirmation is presented in the form of an interactive means of indication, such as a "window" displayed on the display screen, which window has two distinct zones, one of which zones corresponds to "confirmation" and the other to "denial of confirmation" of the first request.

The disclosed embodiments also relate to a method of data transmission between a display screen and a remote client system, wherein a first request to send a message in a first communication protocol is caused to appear on said display screen, wherewith said message is transmitted to said remote client system in a second communication protocol, and said remote client system is controlled by a control unit.

The inventive method comprises the following steps:

the said remote client system sends a raw data message to a communication interface disposed in said display screen, which interface is designed to receive and generate messages in said first communication protocol;

after said communication interface receives said raw data message, the system induces a second request for sending a message in said first communication protocol, to confirm or deny confirmation of said first request, which request is displayed on said display screen;

after said communication interface receives a message in said first communication protocol, the system induces sending of a raw data message simultaneously to said remote client system and said control unit, to inform said client system and said control unit of the confirmation or denial of confirmation of the first request.

Preferably, after said client system receives the message comprising said first request, said control unit sends a raw data message to said display screen or to another display screen, for the purpose of displaying information connected to said first request, in order to allow monitoring and control of said first request.

This stage is advantageously realized in parallel with the sending of a raw data message by the remote client system to the communication interface.

The command or the value entered by the crew in the first request may thus be re-displayed on the same display screen by the intermediary of the control unit which controls the remote client system, in order to allow monitoring and control by the crew. Alternatively, for reasons of uniformization of pilot personnel procedures for double verification, the value may be displayed on another display screen.

Finally, the disclosed embodiments relate to an aircraft, comprising:

at least one remote client system;

a control station which comprises at least one display screen; and a control unit which controls said remote client system.

According to the disclosed embodiments, said aircraft is comprised of a data transmission system for transmitting data between said at least one display screen and said remote client system, of a type described hereinabove.

The disclosed embodiments will be described in more detail hereinbelow, with reference to the accompanying drawings.

BRIEF DESCRIPTION OF THE DRAWINGS

FIGS. 2 and 3 illustrate the system and method of data transmission according to a preferred embodiment. This system comprises two display screens (5, 6), each of which has a "kernel" 7.

Figure 1:
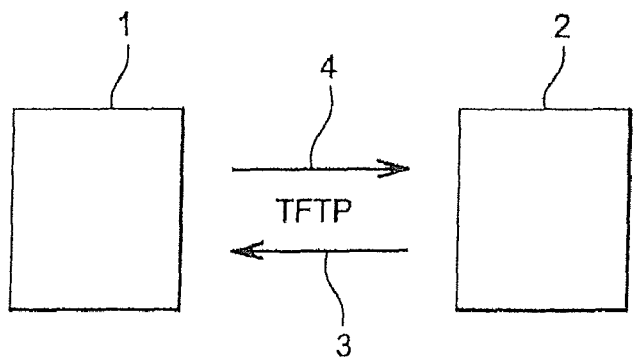
FIG. 1 illustrates an example of data transmission between a display screen and a client system according to the prior art.
Figure 2:
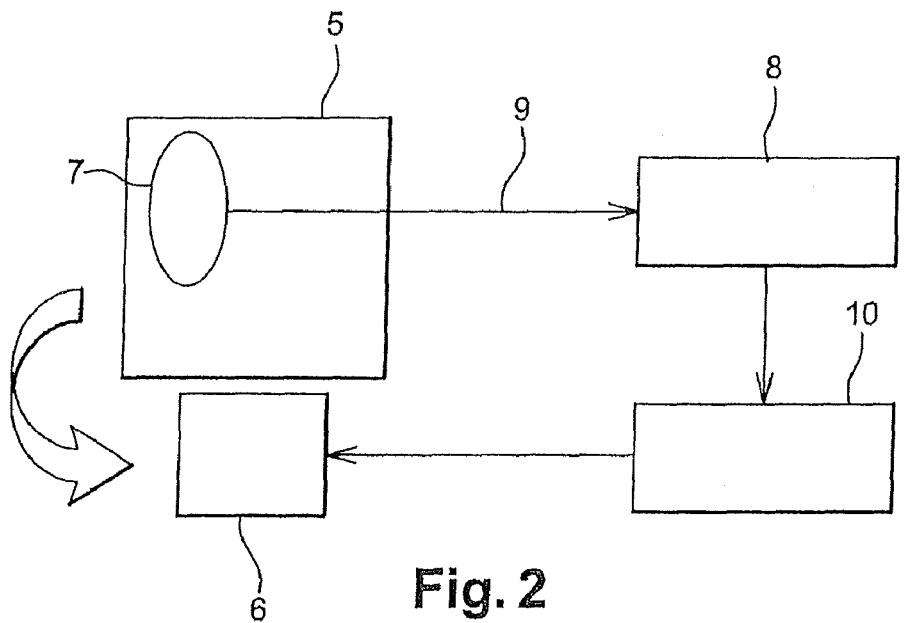
FIG. 2 is a schematic representation of a stage of transmission of data which data have been modified according to a preferred embodiment of the inventive method.

The interior display screens (5, 6) may be, e.g. (purely for purposes of example), LCD screens. The display images which these screens (5, 6) display, notably when they are applied to a "head-down control screen", use such elementary elements as numeric characters, alphanumeric characters, graphic line segments, etc., and possibly employing distinguishable colors.

The display screens (5, 6) are disposed at the control station, adapted to a column located between the work positions of the control persons. This column accommodates a group of control organs, which include in particular a "qwerty" keyboard and a control trackball, for each control person. The trackballs each have special buttons such as "click", and "menu" (right click); and a scroll wheel, etc.

The display screens (5, 6) allow the control person to dialog with the remote system client 8 in order to revise (or query about) a particular task or the execution of the task. The keyboards, control trackballs, and special buttons allow data to be entered into a text field, and allow the user to select a value in a combined display zone of the screen (5, 6). They also allow the user to accept or deny a confirmation (confirm or deny confirmation) of a value or a command.

In the latter case, the control trackballs allow movement of a cursor on the screen, which cursor is generated at the display screen, to select a particular zone of a dialog box displayed on said screen, corresponding to "acceptance" or "denial" of a pending (possible) confirmation, and to "click on" the appropriate said zone.

The "kernel" 7 of the display screen 5 allows the user to, e.g., send transactions, such as selection of a value or notification of a confirmation, from the given display screen to a remote client system 8 using a destination address for said client system. The display screen 5 and the remote client system 8 are connected by a link 9 (here, a point to point link). The communications protocol for communications between the display screen 5 and the remote client system 8 is "ARINC 661".

The remote client system 8 is controlled in the customary manner, by a control unit 10, such as an independent computer.

A communication interface 11 is provided in the display screen 5, which interface is designed to receive and generate messages in the "ARINC 661" protocol, and to receive and send raw data messages from/to the remote client system 8 and the computer 10 [lit., "9"] (the computer 10 [lit., "9"] is included in order to ensure that it takes the transactions into account).

According to a preferred embodiment of the inventive method, confirmation of a command from the remote client system 8, or confirmation of a value modified by the remote client system, is carried out via the steps indicated hereinbelow.

First, one sets up on the display screen 5 a first request to send a message in the ARINC 661 communications protocol. This request may be presented in the form of, e.g., appearance of a text field to be completed, in response to a request from the remote client system 8 to modify a value.

Once the user has received and apprehended the value, the "kernel" 7 addresses a message in ARINC 661 protocol to the remote client system 8 at the latter's destination address, using a data transfer protocol such as TFTP (trivial file transfer protocol). This TFTP protocol also provides for receipt of error codes under circumstances where (for whatever reason) the remote client system 8 was unable to receive the transfer.

Upon receipt of this message providing the modified value, which was input by the control person, the remote client system 8 sends a raw data message to the communication interface 11. This message has the purpose of confirming the modified value, via the communication interface 11, which interface is disposed locally at the CDS.

Thus the raw data message comprises a written request from the remote client system 8 to the communication interface 11, that said interface open a confirmation window for confirming the modified value. For purposes of the transmission, the raw data message is encapsulated, e.g., in an AFDX message (AFDX=avionics full duplex switched ethernet). Alternatively, another support means for aeronautical communications may be employed to transmit the raw data message, e.g. a CAN bus, an A429 link, a series link, etc.

Upon receipt of this request, the communication interface 11 sends a message in the ARINC 661 protocol to the central "kernel" 7, to display a second "send message" request. This second request appears on the display screen 5 in the form of a confirmation window. In parallel, the computer 10 sends a raw data message to the other display screen 6 to display information connected to the first request (here the modified value), so as to permit monitoring and control of the first request. This raw data message may also be encapsulated in an AFDX message.

The crew can then verify that the value input in the first request was correctly taken into account by the remote client system 8, and can confirm execution.

Figure 3:
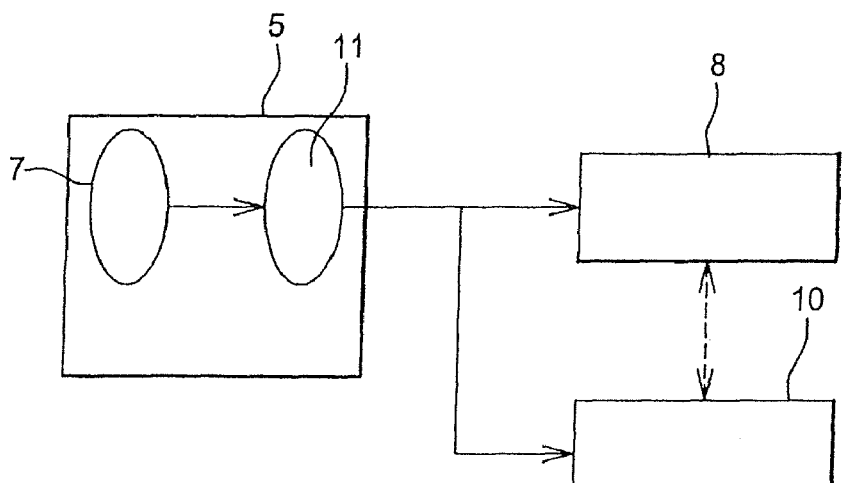
FIG. 3 is a schematic representation of the final stage of the embodiment according to FIG. 2, where transmission of the confirmation of the modified data to the remote client system and to the control unit occurs via the communication interface.

The "kernel" 7 transmits the transaction information, here the confirmation (or denial of confirmation) of the modified value, by a message in ARINC 661 protocol, sent to the communication interface 11 (FIG. 3). When the communication interface 11 receives the message, said interface is induced to send another raw data message to the remote client system 8 and the computer 10, to inform these recipients that the first request has been confirmed (or that confirmation has been denied).

According to a preferred embodiment of the inventive method, the closing of the confirmation window is controlled by the remote client system 8. The remote client system requests such closing by sending a raw data message to the communication interface 11. When the communication interface 11 receives the message, said interface 11 sends a message in ARINC 661 protocol to the "kernel" 7, to bring about closing of this confirmation window.

The invention claimed is:

1. A system of data transmission between at least one display screen and a remote client system, which client system is connected to said screen by a link, and is controlled by a control unit, wherewith said screen is designed to present at least one interactive means of indication which indicates a request to send one or more messages in a first communication protocol; wherein the system comprises a communication interface intended to receive and generate messages in said first communication protocol, as well as to receive and generate messages suitable for being received by said control unit.

2. A system according to claim 1; wherein the said link between the display screen and the remote client system is a point to point link, and said communication interface is disposed in the display screen.

3. A system according to claim 1; wherein said communication interface is designed to receive and send raw data messages from/to said remote client system and/or said control unit.

4. A system according to claim 1; wherein said communication interface is connected via a point to multipoint link to said remote client system and said control unit, and said communication interface has a destination address and is designed to receive the above-described messages in said first communication protocol.

5. A method of data transmission between a display screen and a remote client system, wherein a first request to send a message in a first communication protocol is caused to appear on said display screen, wherewith said message is transmitted to said remote client system in a second communication protocol, and said remote client system is controlled by a control unit; wherein the generation and display on said display screen of a request for confirmation of the first request are induced by the intermediary of a communication interface which is designed to receive and generate messages in said first communication protocol, and to receive and generate messages suitable for receipt by said control unit.

6. A method according to claim 5; wherein the method further comprises:
   said remote client system sends a raw data message to a communication interface disposed in said display screen, which interface is designed to receive and generate messages in said first communication protocol;
   after said communication interface receives said raw data message, the system induces a second request for sending a message in said first communication protocol, to confirm or deny confirmation of said first request, which request is displayed on said display screen;
   after said communication interface receives a message in said first communication protocol, the system induces sending of a raw data message simultaneously to said remote client system and said control unit, to inform said client system and said control unit of the confirmation or denial of confirmation of the first request.

7. A method according to claim 6; wherein, after said client system receives the message comprising said first request, said control unit sends a raw data message to said display screen or to another display screen, for the purpose of displaying information connected to said first request, in order to allow monitoring and control of said first request.

8. A method according to claim 5; wherein the first communication protocol is the ARINC 661 protocol.

9. A method according to claim 8; wherein the second communication protocol is the TFTP (trivial file transfer protocol) protocol.

10. An aircraft, comprising:
    at least one remote client system;
    a control station which comprises at least one display screen; and
    a control unit which controls said remote client system;
    wherein said aircraft is comprised of a data transmission system for transmitting data between said at least one display screen and said remote client system, according to claim 1.

* * * * *